(12) United States Patent
Natsumoto et al.

(10) Patent No.: US 9,951,259 B2
(45) Date of Patent: Apr. 24, 2018

(54) ADHESIVE COMPOSITION AND LAMINATE

(71) Applicants: TOYO INK SC HOLDINGS CO., LTD., Tokyo (JP); TOYO-MORTON, LTD., Tokyo (JP); TOYOCHEM CO., LTD., Tokyo (JP)

(72) Inventors: Tetsuya Natsumoto, Tokyo (JP); Toru Oya, Tokyo (JP); Yoshitaka Tone, Tokyo (JP); Hiroyuki Hayashi, Tokyo (JP); Tetsuya Kaneko, Tokyo (JP); Tadashi Someda, Tokyo (JP); Yoshihiro Sato, Tokyo (JP)

(73) Assignees: TOYO INK SC HOLDINGS CO., LTD., Tokyo (JP); TOYO-MORTON, LTD., Tokyo (JP); TOYOCHEM CO., LTD., Tokyo (JP)

( * ) Notice: Subject to any disclaimer, the term of this patent is extended or adjusted under 35 U.S.C. 154(b) by 0 days.

(21) Appl. No.: 15/538,656

(22) PCT Filed: Dec. 22, 2015

(86) PCT No.: PCT/JP2015/085847
§ 371 (c)(1),
(2) Date: Jun. 22, 2017

(87) PCT Pub. No.: WO2016/104510
PCT Pub. Date: Jun. 30, 2016

(65) Prior Publication Data
US 2017/0355891 A1    Dec. 14, 2017

(30) Foreign Application Priority Data
Aug. 31, 2017  (JP) .................. 2014-259659

(51) Int. Cl.
C09J 175/04       (2006.01)
B32B 27/40        (2006.01)
C08G 18/32        (2006.01)

(52) U.S. Cl.
CPC ............. *C09J 175/04* (2013.01); *B32B 27/40* (2013.01); *C08G 18/3203* (2013.01)

(58) Field of Classification Search
CPC ................ C09J 175/04; B32B 27/40
See application file for complete search history.

(56) References Cited

U.S. PATENT DOCUMENTS 5,096,980 A    3/1992  Yamazaki et al.

FOREIGN PATENT DOCUMENTS

| JP | H02-084482 | 3/1990 |
| JP | H07-094654 | 10/1995 |
| JP | 2004-115681 | 4/2004 |
| JP | 2009-280735 | 12/2009 |
| JP | 4631093 | 2/2011 |
| JP | 2011-102387 | 5/2011 |
| JP | 2011-162656 | 8/2011 |
| JP | 2011162656 A * | 8/2011 |
| JP | 2014-019711 | 2/2014 |
| JP | 2014-118503 | 6/2014 |
| JP | 2015-124335 | 7/2015 |
| WO | 2013005767 | 1/2013 |

OTHER PUBLICATIONS

"International Search Report (Form PCT/ISA/210)", dated Mar. 8, 2016, with English translation thereof, pp. 1-4.
"Office Action of Japan Counterpart Application," with machine English translation thereof, dated Feb. 7, 2017, p. 1-p. 6.

* cited by examiner

*Primary Examiner* — Daniel H Lee
(74) *Attorney, Agent, or Firm* — JCIPRNET

(57) ABSTRACT

Provided is an adhesive which, in a metal foil-containing laminated composite film used in a high temperature sterilization treatment, is resistant to the effects of moisture in the air during curing, has good workability when used as a solvent-free adhesive, and exhibits excellent adhesive strength and acid resistance. Provided is a method for producing an adhesive composition, the method including: a step of obtaining an alcohol-added isocyanate (E) by reacting a trifunctional or higher isocyanate compound (C2) and a monofunctional alcohol (D) at an equivalence ratio of isocyanate groups in the trifunctional or higher isocyanate compound (C2):monofunctional alcohol (D)=100 mol %:25 to 65 mol %, and a step of mixing a polyisocyanate (A) containing a trifunctional or higher isocyanate compound (C1) and the alcohol-added isocyanate (E), and an alcohol (B) having an acid value of 0.5 to 30 mgKOH/g, so that the equivalence ratio between isocyanate groups in the polyisocyanate (A) and hydroxyl groups in the alcohol (B) (isocyanate groups/hydroxyl groups) is within a range from 0.7 to 2.5.

13 Claims, No Drawings

ADHESIVE COMPOSITION AND LAMINATE

CROSS-REFERENCE TO RELATED APPLICATION

This application is a 371 application of International PCT application serial no. PCT/JP2015/085847, filed on Dec. 22, 2015, which claims the priority benefit of Japan application no. 2014-259659, filed on Dec. 24, 2014. The entirety of each of the above-mentioned patent applications is hereby incorporated by reference herein and made a part of this specification.

TECHNICAL FIELD

The present invention relates to an adhesive composition and a laminate.

BACKGROUND ART

In recent years, more stringent regulations and greater appreciation of the importance of environmental preservation and safety have led to increased demands for adhesives containing no solvents, and even in the field of laminated composite films containing a metal foil, which are used in high-temperature sterilization treatments, the removal of solvents from the lamination adhesive used in bonding the metal foil to any of various plastic films is also being investigated.

Conventionally, two-liquid adhesives containing a polyol compound as the main agent and a polyisocyanate compound as the curing agent have been widely used as the solvent-based lamination adhesives used in these types of laminated composite films containing a metal foil, and the introduction of acid groups at the molecular terminals of the polyol compound and the inclusion of phosphoric acid as an additive are widely known techniques for imparting the metal foil with resistance to contents (acid resistance) (for example, see Patent Document 1 or 2).

On the other hand, in terms of solvent-free adhesives, in order to address the problem of increased viscosity due to the removal of solvents, and ensure satisfactory adhesive strength and good acid resistance to contents following curing, a method in which a two-liquid solvent-free adhesive containing a low-molecular weight polyol compound and a polyisocyanate compound is applied to the substrate under high-temperature conditions is generally used.

As a result, compared with solvent-based adhesives, solvent-free adhesives tend to have a much faster curing reaction rate, and for example if the solvent-free adhesive is used as a lamination adhesive for a high-temperature sterilization treatment, and acid groups are introduced into the main agent for the purpose of imparting the metal foil with acid resistance, then a problem arises in that curing is accelerated even further due to the urethanization catalytic effect of the acid groups, meaning the viscosity increase that occurs following mixing of the main agent and the curing agent is very rapid, resulting in a marked deterioration in workability.

In response to this type of problem, for example, Patent Document 3 proposes a method of ensuring that at least 30% of all the hydroxyl groups within the main agent polyol compound are secondary or tertiary hydroxyl groups, thereby lowering the hydroxyl group reactivity, and discloses that even when acid groups are introduced into the main agent, viscosity increases can be suppressed, and a solvent-free adhesive having good acid resistance can be obtained.

However, the reactivity of a secondary or tertiary hydroxyl group with an isocyanate group is generally similar to, or less than, that of water, and therefore the adhesive is prone to the effects of moisture in the air during curing, and for example if the adhesive application operation and aging operation are performed under high humidity conditions, then a problem arises in that because the amount of reaction between the isocyanate groups and water increases compared with the case of low-humidity conditions, the adhesive strength and the acid resistance tend to deteriorate.

Further, Patent Document 4 discloses that by using a diisocyanate-terminated prepolymer and an allophanate-modified diisocyanate obtained by reacting a portion of the isocyanate groups with an alcohol, the contents resistance following a heat sterilization treatment can be improved, and favorable pot life and workability can be achieved.

However, if an allophanate-modified diisocyanate is used, then a problem arises in that heat sterilization over a long period causes a deterioration in the adhesive strength.

PRIOR ART DOCUMENTS

Patent Documents

Patent Document 1: JP H07-94654 B
Patent Document 2: JP H02-84482 A
Patent Document 3: JP 4,631,093 B
Patent Document 4: JP 2011-162656 A

SUMMARY OF INVENTION

Problems to be Solved

The present invention provides an adhesive which, in a metal foil-containing laminated composite film used in a high-temperature sterilization treatment, is resistant to the effects of moisture in the air during curing, has good workability when used as a solvent-free adhesive, and exhibits excellent adhesive strength and acid resistance.

Means for Solving the Problems

One embodiment of the present invention provides a method for producing an adhesive composition, the method including:

a step of obtaining an alcohol-added isocyanate (E) by reacting a trifunctional or higher isocyanate compound (C2) and a monofunctional alcohol (D) at an equivalence ratio of isocyanate groups in the trifunctional or higher isocyanate compound (C2):monofunctional alcohol (D)=100 mol %:25 to 65 mol %, and a step of mixing a polyisocyanate (A) containing a trifunctional or higher isocyanate compound (C1) and the alcohol-added isocyanate (E), and an alcohol (B) having an acid value of 0.5 to 30 mgKOH/g, so that the equivalence ratio between isocyanate groups in the polyisocyanate (A) and hydroxyl groups in the alcohol (B) (isocyanate groups/hydroxyl groups) is within a range from 0.7 to 2.5.

In one embodiment of the present invention, the alcohol-added isocyanate (E) may be included in an amount of 20 to 80% by weight of 100% by weight of the polyisocyanate (A).

In one embodiment of the present invention, the trifunctional or higher isocyanate compound (C1) may be a trimer of at least one diisocyanate compound selected from the group consisting of aliphatic diisocyanates, araliphatic diisocyanates and alicyclic diisocyanates.

In one embodiment of the present invention, the trifunctional or higher isocyanate compound (C2) may be a trimer of at least one diisocyanate compound selected from the group consisting of aliphatic diisocyanates, araliphatic diisocyanates and alicyclic diisocyanates.

In one embodiment of the present invention, the monofunctional alcohol (D) may be an alicyclic alcohol (D1).

In one embodiment of the present invention, the alcohol (B) may include a polyol (B1) having an acid value of 1 to 15 mgKOH/g.

In one embodiment of the present invention, at least 70 mol % among 100 mol % of all the hydroxyl groups within the polyol (B1) may be primary hydroxyl groups.

In one embodiment of the present invention, the alcohol (B) may include a polyol (B1) having an acid value of 15 to 40 mgKOH/g and a monofunctional alcohol (B2), wherein the amount of the monofunctional alcohol (B2) within 100% by weight of the alcohol (B) is not more than 50% by weight.

One embodiment of the present invention provides an adhesive composition that satisfies the relationship of formula 1 shown below:

$$Xa/56.1 \times Xc - Yh/56.1 \times Yc \leq 0.26 \quad (1)$$

(wherein Xa represents the acid value (mgKOH/g) of the polyol (B1), Xc represents the weight ratio of the polyol (B1) within the total weight of the polyol (B1) and the monofunctional alcohol (B2), Yh represents the hydroxyl value (mgKOH/g) of the monofunctional alcohol (B2), and Yc represents the weight ratio of the monofunctional alcohol (B2) within the total weight of the polyol (B1) and the monofunctional alcohol (B2)).

In one embodiment of the present invention, the molecular weight of the monofunctional alcohol (B2) may be at least 100 but not more than 6,000.

In one embodiment of the present invention, the adhesive composition may be solvent-free.

In one embodiment of the present invention, the adhesive composition may be for use in a laminated composite film containing a metal foil.

One embodiment of the present invention provides a method for producing a laminate, the method including a step of bonding at least two sheet-like substrates using an adhesive composition produced using the production method of the present invention.

The method for producing a laminate includes:

a step of obtaining an alcohol-added isocyanate (E) by reacting a trifunctional or higher isocyanate compound (C2) and a monofunctional alcohol (D) at an equivalence ratio of isocyanate groups in the trifunctional or higher isocyanate compound (C2):monofunctional alcohol (D)=100 mol %:25 to 65 mol %, a step of obtaining an adhesive composition by mixing a polyisocyanate (A) containing a trifunctional or higher isocyanate compound (C1) and the alcohol-added isocyanate (E), and an alcohol (B) having an acid value of 0.5 to 30 mgKOH/g, so that the equivalence ratio between isocyanate groups in the polyisocyanate (A) and hydroxyl groups in the alcohol (B) (isocyanate groups/hydroxyl groups) is within a range from 0.7 to 2.5, and a step of bonding at least two sheet-like substrates using the obtained adhesive composition.

One embodiment of the present invention provides an adhesive composition containing a polyisocyanate (A) and an alcohol (B), wherein the polyisocyanate (A) contains a trifunctional or higher isocyanate compound (C1) and an alcohol-added isocyanate (E), the alcohol-added isocyanate (E) is obtained by reacting a trifunctional or higher isocyanate compound (C2) and a monofunctional alcohol (D) at an equivalence ratio of isocyanate groups in the trifunctional or higher isocyanate compound (C2):monofunctional alcohol (D)=100 mol %:25 to 65 mol %, the acid value of the alcohol (B) is from 0.5 to 30 mgKOH/g, and the equivalence ratio between isocyanate groups in the polyisocyanate (A) and hydroxyl groups in the alcohol (B) (isocyanate groups/hydroxyl groups) is within a range from 0.7 to 2.5.

Effects of the Invention

The present invention is able to provide an adhesive which, in a metal foil-containing laminated composite film used in a high-temperature sterilization treatment, is resistant to the effects of moisture in the air during curing, has good workability when used as a solvent-free adhesive, and exhibits excellent adhesive strength and acid resistance.

EMBODIMENTS FOR CARRYING OUT THE INVENTION

Embodiments of the present invention are described below in detail, but the descriptions of constituent elements presented below are merely examples of the embodiments of the present invention, and the present invention is in no way limited by the content of the following embodiments without departing from the spirit and scope of the present invention.

The present invention provides an adhesive composition containing a polyisocyanate (A) and an alcohol (B). The adhesive composition of the present invention may be a so-called two-liquid curable composition in which the polyisocyanate (A) and the alcohol (B) are mixed together at the time of use, or may be a one-liquid composition in which the polyisocyanate (A) and the alcohol (B) have already been mixed together. The adhesive composition of the present invention is preferably a two-liquid curable composition. Further, in the adhesive composition of the present invention, a plurality of each of the polyisocyanate (A) and the alcohol (B) may be used. The alcohol (B) is preferably a mixture of a polyol (B1) and a monofunctional alcohol (B2), but the polyol (B1) may also be used alone.

<Polyisocyanate (A)>

The polyisocyanate (A) used in the present invention contains a trifunctional or higher isocyanate compound (C1) and an alcohol-added isocyanate (E), which is a reaction product obtained by reacting a trifunctional or higher isocyanate compound (C2) and a monofunctional alcohol (D) at an equivalence ratio that provides 25 to 65 mol % of the monofunctional alcohol (D) relative to 100 mol % of the isocyanate groups in the trifunctional or higher isocyanate compound (C2). From the viewpoints of acid resistance, pot life and adhesive strength, the proportion of the alcohol-added isocyanate (E) within 100% by weight of the polyisocyanate (A) is preferably within a range from 20 to 80% by weight, and more preferably from 30 to 50% by weight.

<Trifunctional or Higher Isocyanate Compound (C1)>

There are no particular limitations on the trifunctional or higher isocyanate compound (C1) used in the present invention, provided it is a compound having three or more isocyanate groups, and examples include, but not limited to, biurets, nurates, adducts and allophanates, which are trimers of diisocyanate compounds such as aliphatic diisocyanates, aromatic diisocyanates, araliphatic diisocyanates and alicyclic diisocyanates, as well as urethane prepolymers obtained by reacting an isocyanate and a polyol.

Examples of the aliphatic diisocyanates include, but not limited to, trimethylene diisocyanate, tetramethylene diisocyanate, hexamethylene diisocyanate (alternative name: HDI), pentamethylene diisocyanate, 1,2-propylene diisocyanate, 2,3-butylene diisocyanate, 1,3-butylene diisocyanate, dodecamethylene diisocyanate and 2,4,4-trimethylhexamethylene diisocyanate.

Examples of the aromatic diisocyanates include, but not limited to, 1,3-phenylene diisocyanate, 4,4'-diphenyl diisocyanate, 1,4-phenylene diisocyanate, 4,4'-diphenylmethane diisocyanate, 2,4-tolylene diisocyanate, 2,6-tolylene diisocyanate, 4,4'-toluidine diisocyanate, 2,4,6-triisocyanatotoluene, 1,3,5-triisocyanatobenzene, dianisidine diisocyanate, 4,4'-diphenyl ether diisocyanate and 4,4',4''-triphenylmethane triisocyanate.

An araliphatic diisocyanate means an aliphatic isocyanate having at least one aromatic ring within the molecule, and examples include, but not limited to, in- or p-xylylene diisocyanate (alternative name: XDI) and α,α,α,α'-tetramethylxylylene diisocyanate (alternative name: TMXDI).

Examples of the alicyclic diisocyanate include, but not limited to, 3-isocyanatomethyl-3,5,5-trimethylcyclohexyl isocyanate, isophorone diisocyanate (alternative name: IPDI), 1,3-cyclopentane diisocyanate, 1,3-cyclohexane diisocyanate, 1,4-cyclohexane diisocyanate, methyl-2,4-cyclohexane diisocyanate, methyl-2,6-cyclohexane diisocyanate, 4,4'-methylenebis(cyclohexyl isocyanate) and 1,4-bis(isocyanatomethyl)cyclohexane.

There are no particular limitations on the polyol that constitutes the urethane prepolymer, and examples include, but not limited to, each of the various types of polyols such as polyether polyols, polyester polyols, polyalkylene polyols and polycarbonate polyols. These polyols may be used individually, or a mixture containing two or more polyols may be used.

Examples of the polyether polyols include, but not limited to, those obtained by polymerizing an oxirane compound such as ethylene oxide, propylene oxide, butylene oxide or tetrahydrofuran using, for example, water or a low-molecular weight polyol such as ethylene glycol, propylene glycol, trimethylolpropane or glycerol as an initiator.

Although not limited to the following examples, specific examples of the polyester polyols include condensation products obtained by an esterification of a dibasic acid and a diol; caprolactone polymers, valerolactone polymers, methylvalerolactone polymers, lactic acid polymers and castor oil fatty acid polymers obtained using an aforementioned diol as an initiator; and reaction products obtained by reacting the hydroxyl groups of an aforementioned polycondensation product with an acid anhydride.

Although not limited to the following examples, specific examples of the dibasic acid include adipic acid, isophthalic acid, terephthalic acid, maleic acid, fumaric acid, succinic acid, oxalic acid, malonic acid, pimelic acid, azelaic acid, sebacic acid, suberic acid, glutaric acid, 1,4-cyclohexyldicarboxylic acid, dimer acids, and hydrogenated dimer acids.

Although not limited to the following examples, specific examples of the diol include ethylene glycol, diethylene glycol, triethylene glycol, propylene glycol, 1,3-propanediol, 1,4-butanediol, 1,3-butanediol, 1,6-hexanediol, 1,8-octanediol, 1,9-nonanediol, neopentyl glycol, 3-methyl-1,5-pentanediol, 2-methyl-1,3-propanediol, 3,3,5-trimethylpentanediol, 2,4-diethyl-1,5-pentanediol, 1,12-octadecanediol, 1,2-alkanediols, 1,3-alkanediols, 1-monoglycerides, 2-monoglycerides, 1-monoglyceryl ethers, 2-monoglyceryl ethers, dimer diols and hydrogenated dimer diols.

Although not limited to the following examples, specific examples of the acid anhydride include phthalic anhydride, trimellitic anhydride, pyromellitic anhydride, and trimellitate ester anhydrides such as RIKACID TMEG-X (wherein X represents 100, 200, 500, 600 or S) and RIKACID TMA-X (wherein X represents C, 10 or 15) available from New Japan Chemical Co., Ltd.

Examples of the polyalkylene polyols include, but not limited to, polybutadiene polyol, hydrogenated polybutadiene polyol, polyisoprene polyol and hydrogenated polyisoprene polyol.

Examples of the polycarbonate polyols include, but not limited to, poly(tetramethylene carbonate) polyol, poly(hexamethylene carbonate) polyol, poly(cyclohexanedimethylene carbonate) polyol, poly-3-methyl-1,5-pentanediol carbonate polyol, poly-2-methyl-1,8-octanediol carbonate polyol and poly-1,9-nonanediol carbonate polyol.

There are no particular limitations on the isocyanate that constitutes the urethane prepolymer, and examples include the aforementioned diisocyanate compounds such as aliphatic diisocyanates, aromatic diisocyanates, araliphatic diisocyanates and alicyclic diisocyanates, as well as biurets, nurates, adducts and allophanates, which are trimers of these diisocyanates.

The number average molecular weight of the trifunctional or higher isocyanate compound (C1) is preferably not more than 2,000, as this results in more favorable pot life. The number average molecular weight of the trifunctional or higher isocyanate compound (C1) is more preferably 1,500 or less.

These trifunctional or higher isocyanate compounds (C1) may be used individually, or a mixture containing two or more compounds may be used.

Among the various possibilities, in those cases where the adhesive composition of the present invention is used as a solvent-free adhesive, the use of a biuret, nurate, adduct or allophanate of an alicyclic diisocyanate or aliphatic diisocyanate is preferable in terms of viscosity, pot life and acid resistance, and from the viewpoint of adhesive strength, the combined use of IPDI nurate with either HDI biuret or HDI nurate is particularly preferred. The amount used of the IPDI nurate preferably represents 10 to 50% by weight, and more preferably 20 to 40% by weight, of the trifunctional or higher isocyanate compound (C1).

<Alcohol-Added Isocyanate (E)>

The alcohol-added isocyanate (E) used in the present invention is obtained by reacting a trifunctional or higher isocyanate compound (C2) and a monofunctional alcohol (D) in a ratio that provides 25 to 65 mol % of the monofunctional alcohol (D) relative to 100 mol % of the isocyanate groups in the trifunctional or higher isocyanate compound (C2). The alcohol-added isocyanate (E) is a mixture of adducts having one molecule, two molecules, three molecules, or even more molecules of the monofunctional alcohol (D) added to one molecule of the trifunctional or higher isocyanate compound (C2) (namely, monofunctional to polyfunctional alcohol-added isocyanate compounds).

There are no particular limitations on the method used for producing the alcohol-added isocyanate (E), and for example, the alcohol-added isocyanate (E) may be obtained by reacting the trifunctional or higher isocyanate compound (C2) and the monofunctional alcohol (D) under an atmosphere of an inert gas such as nitrogen by a conventional urethanization reaction.

The amount of the monofunctional alcohol (D) is preferably within a range from 25 to 65 mol % relative to 100 mol % of the isocyanate groups in the trifunctional or higher isocyanate compound (C2). If the reaction rate of the monofunctional alcohol (D) is less than 25 mol %, then satisfactory acid resistance may be unobtainable, whereas if the reaction rate exceeds 65 mol %, the adhesive strength tends to deteriorate. The reaction rate is preferably within a range from 30 to 50 mol %. The alcohol-added isocyanate (E) that represents the reaction product may contain a residual amount of unreacted trifunctional or higher isocyanate compound (C2).

<Trifunctional or Higher Isocyanate Compound (C2)>

There are no particular limitations on the trifunctional or higher isocyanate compound (C2) that functions as a raw material for the alcohol-added isocyanate (E), provided it is a compound having three or more isocyanate groups, and examples include biurets, nurates, adducts and allophanates, which are trimers of diisocyanate compounds such as aliphatic diisocyanates, aromatic diisocyanates, araliphatic diisocyanates and alicyclic diisocyanates, as well as urethane prepolymers obtained by reacting an isocyanate and a polyol. Specific examples of preferred diisocyanates and urethane prepolymers include the same compounds as those listed above for the trifunctional or higher isocyanate compound (C1).

The trifunctional or higher isocyanate compound (C2) may be the same as, or different from, the trifunctional or higher isocyanate compound (C1). In those cases where the adhesive composition is used as a solvent-free adhesive, the use of an aliphatic diisocyanate as the diisocyanate is preferable in terms of viscosity, pot life and acid resistance, and the use of HDI is particularly preferred. Further, a biuret, nurate or adduct is preferred as the trimer, and a biuret or nurate is more preferred.

<Monofunctional Alcohol (D)>

There are no particular limitations on the monofunctional alcohol (D), provided it has a single hydroxyl group within the molecule, and examples include, but not limited to, alicyclic alcohols (D1), aliphatic alcohols and aromatic alcohols.

There are no particular limitations on the alicyclic alcohol (D1), provided it is an alcohol containing one or more saturated or unsaturated carbon rings having no aromaticity. Examples of the saturated or unsaturated carbon ring include, but not limited to, monocyclic cycloalkanes such as cyclopropane, cyclobutane, cyclopentane, cyclohexane, cycloheptane, cyclooctane, cyclononane, cyclodecane, cycloundecane and cyclododecene; monocyclic cycloalkenes such as cyclopropene, cyclobutene, cyclopentene, cyclohexene, cycloheptene and cyclooctene; bicyclic alkanes such as bicycloundecane and decahydronaphthalene; bicyclic alkenes such as norbornene and norbornadiene; and tricyclic or higher alkanes or alkenes such as tricyclodecane, adamantane and steroids. These carbon rings may also have one or more aliphatic branches.

Specific examples of preferred alicyclic alcohols (D1) include, but not limited to, cyclopentanol, methylcyclopentanol, cyclopentylmethanol, cyclopentylpropanol, cyclohexanol, cyclohexylethanol, cyclohexylpropanol, cyclohexylbutanol, methyl-, ethyl-, propyl- and butyl-cyclohexanol, cycloheptanol, cyclooctanol, menthol, decahydro-2-naphthol, borneol, hydroxydicyclopentadiene and cholesterol.

Examples of the aliphatic alcohols include, but not limited to, monofunctional alcohols having a linear alkyl group, such as methanol, ethanol, propanol, butanol, pentanol, hexanol, octanol, nonanol, decanol, undecanal, dodecanol, tridecanol, tetradecanol, pentadecanol, hexadecanol, heptadecanol, octadecanol, nonadecanol, eicosanol, heneicosanol, docosanol, tricosanol, tetracosanol and pentacosanol, and monofunctional alcohols having a branched alkyl group, such as 2-butanol, isobutanol, tert-butanol, 2-pentanol, 3-pentanol, isopentanol, 2-methyl-1-butanol, 2-methyl-3-butanol, 2,2-dimethyl-1-propanol, tert-pentanol, 2-hexanol, 3-hexanol, isohexanol, 2-methyl-2-pentanol, 2-methyl-1-pentanol, 3-methyl-1-pentanol, 2-ethyl-1-butanol, 3,3-dimethyl-1-butanol, 2-heptanol, 3-heptanol, 4-heptanol, 5-methyl-1-hexanol, 4-methyl-1-hexanol, 3-methyl-1-hexanol, 2-ethyl-2-methyl-1-butanol, isooctanol, 2-ethyl-1-hexanol, isononanol, 3,5,5-trimethylhexanol, isodecanol, isoundecanol, 5-ethyl-2-nonanol, isododecanol, isotridecanol, isotetradecanol, isopentadecanol, isohexadecanol, 2-hexyldecanol, 3,9-diethyl-6-tridecanol, 2-isoheptylisoundecanol, 2-octyldodecanol, 2-decyltetradecanol and 2-methylstearyl alcohol.

Examples of the aromatic alcohols include, but not limited to, benzyl alcohol, methylphenylmethanol, methoxyphenylmethanol, ethylphenylmethanol, ethoxyphenylmethanol, butylphenylmethanol, butoxyphenylmethanol, phenylethanol, methylphenylethanol, methoxyphenylethanol, ethylphenylethanol, ethoxyphenylethanol, butylphenylethanol, butoxyphenylethanol, phenylpropanol, methylphenylpropanol, methoxyphenylpropanol, ethylphenylpropanol, ethoxyphenylpropanol, butylphenylpropanol, butoxyphenylpropanol, phenylbutanol, methylphenylbutanol, methoxyphenylbutanol, ethylphenylbutanol, ethoxyphenylbutanol, butylphenylbutanol, butoxyphenylbutanol and furfuryl alcohol.

Among the above compounds, the use of an alicyclic alcohol (D1) is particularly preferred from the viewpoint of adhesive strength. These monofunctional alcohols may be used individually, or a mixture containing two or more compounds may be used.

<Alcohol (B)>

There are no particular limitations on the alcohol (B) used in the present invention, provided it has an acid value within a range from 0.5 to 30 mgKOH/g, and examples include polyester polyols having acid groups. If the acid value of the alcohol (B) is less than 0.5 mgKOH/g, then satisfactory acid resistance may be unobtainable, whereas if the acid value exceeds 30 mgKOH/g, the pot life deteriorates. The acid value is preferably within a range from 1 mgKOH/g to 25 mgKOH/g.

The alcohol (B) preferably includes a polyol (B1) and a monofunctional alcohol (B2), but may be composed solely of the polyol (B1). When the alcohol (B) is composed solely of the polyol (B1), the acid value of the polyol (B1) may preferably be from 1 to 15 mgKOH/g. Further, when the alcohol (B) includes both the polyol (B1) and the monofunctional alcohol (B2), the acid value of the polyol (B1) may preferably be from 15 to 40 mgKOH/g, and the amount of the monofunctional alcohol (B2) within 100% by weight of the alcohol (B) is preferably not more than 50% by weight. The amount of the monofunctional alcohol (B2) within 100% by weight of the alcohol (B) is preferably from 1 to 50% by weight, and more preferably from 1 to 40% by weight.

<Polyol (B1)>

There are no particular limitations on the polyol (B1) used in the present invention, provided it has an acid value of 1 to 40 mgKOH/g, and examples include polyester polyols having acid groups. If the acid value of the polyol (B1) is less than 1 mgKOH/g, then satisfactory acid resistance may be unobtainable, whereas if the acid value exceeds 40 mgKOH/g, the pot life deteriorates. The acid value of the polyol (B1) may, for example, be within a range from 1 to 25 mgKOH/g, from 1 to 30 mgKOH/g, from 1 to 40 mgKOH/g, from 2 to 25 mgKOH/g, from 2 to 30 mgKOH/g or from 2 to 40 mgKOH/g. The acid value of the polyol (B1) is more preferably at least 2 mgKOH/g but less than 25 mgKOH/g.

Although not limited to the following examples, specific examples of the polyester polyol having acid groups include condensation products obtained by an esterification of a dibasic acid and a diol; caprolactone polymers, valerolactone polymers, methylvalerolactone polymers, lactic acid polymers and castor oil fatty acid polymers obtained using an aforementioned diol as an initiator; and reaction products obtained by reacting the hydroxyl groups of an aforementioned polycondensation product with an acid anhydride.

Although not limited to the following examples, specific examples of the dibasic acid include adipic acid, isophthalic acid, terephthalic acid, maleic acid, fumaric acid, succinic acid, oxalic acid, malonic acid, pimelic acid, azelaic acid, sebacic acid, suberic acid, glutaric acid, 1,4-cyclohexyldicarboxylic acid, dimer acids, and hydrogenated dimer acids.

Although not limited to the following examples, specific examples of the diol include ethylene glycol, diethylene glycol, triethylene glycol, propylene glycol, 1,3-propanediol, 1,4-butanediol, 1,3-butanediol, 1,6-hexanediol, 1,8-octanediol, 1,9-nonanediol, neopentyl glycol, 3-methyl-1,5-pentanediol, 2-methyl-1,3-propanediol, 3,3,5-trimethylpentanediol, 2,4-diethyl-1,5-pentanediol, 1,12-octadecanediol, 1,2-alkanediols, 1,3-alkanediols, 1-monoglycerides, 2-monoglycerides, 1-monoglyceryl ethers, 2-monoglyceryl ethers, dimer diols and hydrogenated dimer diols.

Although not limited to the following examples, specific examples of the acid anhydride include phthalic anhydride, trimellitic anhydride, pyromellitic anhydride, and trimellitate ester anhydrides such as RIKACID TMEG-X (wherein X represents 100, 200, 500, 600 or S) and RIKACID TMA-X (wherein X represents C, 10 or 15) available from New Japan Chemical Co., Ltd.

It is preferable that at least 70 mol % of all the hydroxyl groups within the polyol (B1) are primary hydroxyl groups, namely that the amount of secondary and tertiary hydroxyl groups is less than 30 mol % of all the hydroxyl groups. Provided this range is satisfied, the reactivity of the polyol component increases, meaning satisfactory adhesive strength and acid resistance can be obtained regardless of the humidity conditions during the application operation and aging operation.

In the present description, a primary hydroxyl group means a group in which the number of carbon atoms bonded to the carbon atom that is bonded to the hydroxyl group (—OH) is one, whereas a secondary hydroxyl group or a tertiary hydroxyl group means a group in which the above number of carbon atoms is two or three respectively.

The number average molecular weight of the polyol (B1) is preferably within a range from 300 to 5,000, as this results in more favorable acid resistance and pot life. The number average molecular weight of the polyol (B1) is more preferably from 450 to 2,000.

These polyols may be used individually, or a mixture containing two or more polyols may be used.

<Monofunctional Alcohol (B2)>

There are no particular limitations on the monofunctional alcohol (B2) used in the present invention, and examples include aliphatic monools, alicyclic monools, araliphatic monools, polyoxyalkylene monools, and oxycarboxylate esters.

Examples of the aliphatic monools include, but not limited to, methanol, ethanol, propanol, butanol, pentanol, hexanol, heptanol, octanol, nonanol, decanol, lauryl alcohol, myristyl alcohol, pentadecanol, cetyl alcohol, heptadecanol, stearyl alcohol, nonadecanol, other alkanols (C20 to C50), oleyl alcohol, and isomers of these monools.

Examples of the alicyclic monools include, but not limited to, cyclohexanol, methylcyclohexanol, 4-butylcyclohexanol, 4-pentylcyclohexanol, 4-hexylcyclohexanol, cyclodecanol, cyclododecanol, cyclopentadecanol, 4-isopropylcyclohexanol, 3,5,5-trimethylcyclohexanol, menthol, 2-norbornanol, borneol, 2-adamantanol, dicyclohexylmethanol, decatol, 2-cyclohexylcyclohexanol, 4-cyclohexylcyclohexanol, 4-(4-propylcyclohexyl)cyclohexanol, 4-(4-pentyl cyclohexyl)cyclohexanol, α-ambrinol, desoxycorticosterone, 11-dehydrocorticosterone, cholesterol, β-sitosterol, campesterol, stigmasterol, brassicasterol, lanosterol, ergosterol, β-cholestanol, testosterone, estrone, digitoxigenin, dehydroepiandrosterone, coprostanol, pregnenolone, epicholestanol, 7-dehydrocholesterol, estradiol benzoate, tigogenin, hecogenin, methandienone, cortisone acetate, stenolon, and isomers of these monools.

An example of an araliphatic monool includes, but not limited to, benzyl alcohol.

Examples of the polyoxyalkylene monools include, but not limited to, compounds obtained by subjecting an alkylene oxide such as ethylene oxide, propylene oxide, butylene oxide or tetrahydrofuran to a ring-opening addition polymerization using an alkyl compound or the like containing one active hydrogen as an initiator.

Examples of the oxycarboxylate esters include, but not limited to, hydroxyl group-containing esters obtained from an oxycarboxylic acid such as glycolic acid, lactic acid, tartronic acid, glyceric acid, hydroxyacetic acid, hydroxybutyric acid, malic acid, citric acid, isocitric acid, ricinoleic acid, α-oxypropionic acid, oxysuccinic acid, dioxysuccinic acid, hydroxystearic acid, ricinelaidic acid, ricinostearolic acid or mandelic acid, and an aforementioned monool.

The number average molecular weight of the monofunctional alcohol (B2) is preferably within a range from 100 to 6,000, as this results in more favorable pot life. The number average molecular weight of the monofunctional alcohol (B2) is more preferably from 200 to 4,000.

A polyol (B1) having an acid value of 1 to 15 mgKOH/g may be used alone as the alcohol (B). Provided the acid value of the polyol (B1) is at least 1 mgKOH/g, satisfactory contents resistance can be obtained, and provided the acid value is less than 15 mgKOH/g, the pot life is favorable. The acid value is more preferably at least 2 mgKOH/g but less than 10 mgKOH/g.

Further, by combining a polyol (B1) having an acid value of 15 to 40 mgKOH/g and a monofunctional alcohol (B2), superior acid resistance can be achieved. Provided the acid value of the polyol (B1) is at least 15 mgKOH/g, superior contents resistance can be obtained. Further, provided the acid value is less than 40 mgKOH/g, the pot life is favorable. The acid value of the polyol (B1) may, for example, be within a range from 15 to 25 mgKOH/g, from 15 to 30 mgKOH/g, or from 15 to 40 mgKOH/g. The acid value of the polyol (B1) is more preferably at least 15 mgKOH/g but less than 25 mgKOH/g.

In those cases where the polyol (B1) and the monofunctional alcohol (B2) are combined, it is preferable that the relationship of formula 1 shown below is satisfied, as this results in improved pot life.

$$Xa/56.1 \times Xc - Yh/56.1 \times Yc \leq 0.26 \quad (1)$$

(In the formula, Xa represents the acid value (mgKOH/g) of the polyol (B1), Xc represents the weight ratio of the polyol (B1) within the total weight of the polyol (B1) and the monofunctional alcohol (B2), Yh represents the hydroxyl value (mgKOH/g) of the monofunctional alcohol (B2), and Yc represents the weight ratio of the monofunctional alcohol (B2) within the total weight of the polyol (B1) and the monofunctional alcohol (B2).)

As shown above, the value of the left side of formula 1 is preferably not more than 0.26, and is more preferably 0.23 or less.

In the adhesive composition of the present invention, the equivalence ratio between isocyanate groups in the polyisocyanate (A) and hydroxyl groups in the alcohol (B) (isocyanate groups/hydroxyl groups) is within a range from 0.7 to 2.5, and is preferably from 0.8 to 2.5, and more preferably from 1.0 to 2.0. If the ratio of isocyanate groups/hydroxyl groups is less than 0.7, then satisfactory adhesive strength may be unobtainable, whereas if the ratio of isocyanate groups/hydroxyl groups exceeds 2.5, then the acid resistance tends to deteriorate.

From the viewpoints of safety and reducing environmental impact, the adhesive composition of the present invention is preferably used as a solvent-free adhesive, but a small amount of an organic solvent or water may be included if required.

Although not limited to the following examples, specific examples of the organic solvent include aliphatic alcohols of 1 to 7 carbon atoms, such as methanol, ethanol, n-propanol, isopropanol, n-butanol, isobutanol and tert-butanol; glycol monoethers such as propylene glycol monomethyl ether, propylene glycol monoethyl ether, propylene glycol monopropyl ether, propylene glycol monoisopropyl ether and propylene glycol monobutyl ether; ketones such as acetone and methyl ethyl ketone; esters such as ethyl acetate and propyl acetate; and carbonate esters such as dimethyl carbonate.

These organic solvents or water may be used individually, or a mixture containing two or more solvents may be used.

The adhesive composition of the present invention may also contain, for the purpose of further improving the adhesive strength and the acid resistance, a silane coupling agent, or a phosphorus oxoacid or derivative thereof, which is preferably added in an amount of 0.01 to 5% by weight, and more preferably 0.02 to 3% by weight, relative to 100% by weight of the alcohol (B).

Examples of the silane coupling agent include, but not limited to, aminosilanes such as γ-aminopropyltriethoxysilane, γ-aminopropyltrimethoxysilane, N-β-(aminoethyl)-γ-aminopropyltrimethoxysilane, N-β-(aminoethyl)-γ-aminopropyl trimethyldimethoxysilane and N-phenyl-γ-aminopropyltrimethoxysilane, epoxysilanes such as β-(3,4-epoxycyclohexyl)ethyltrimethoxysilane, γ-glycidoxypropyltrimethoxysilane and γ-glycidoxypropyltriethoxysilane.

vinylsilanes such as vinyltris(β-methoxyethoxy)silane, vinyltriethoxysilane, vinyltrimethoxysilane and γ-methacryloxypropyltrimethoxysilane, and hexamethyldisilazane and γ-mercaptopropyltrimethoxysilane.

There are no particular limitations on the phosphorus oxoacid provided it contains at least one free oxoacid, and examples include phosphoric acids such as hypophosphorous acid, phosphorous acid, orthophosphoric acid and hypophosphoric acid; and condensed phosphoric acids such as metaphosphoric acid, pyrophosphoric acid, tripolyphosphoric acid, polyphosphoric acid and ultraphosphoric acid.

Examples of the phosphorus oxoacid derivatives include, but not limited to, compounds obtained by partially esterifying one of the above phosphorus oxoacids in a state that retains at least one free oxoacid. Examples of the alcohols that may be used include, but not limited to, aliphatic alcohols such as methanol, ethanol, ethylene glycol and glycerol; and aromatic alcohols such as phenol, xylenol, hydroquinone, catechol and phloroglucinol.

These silane coupling agents, and phosphorus oxoacids or derivatives thereof may be used individually, or a mixture containing two or more compounds may be used.

In addition to the components described above, the adhesive composition of the present invention may also contain, as required, additives such as fillers, softening agents, age resistors, stabilizers, adhesion promoters, leveling agents, antifoaming agents, plasticizers, inorganic fillers, adhesive-imparting resins, fibers, usable time extenders, antioxidants, ultraviolet absorbers, hydrolysis inhibitors, fungicides, thickeners; colorants such as pigments.

Next is a description of a method for producing a laminate using the solvent-free adhesive composition described above and at least two sheet-like substrates.

The method for producing a laminate according to the present invention may employ a conventional solvent-free adhesive composition lamination method, and specifically, the adhesive composition obtained by uniformly mixing the polyisocyanate (A) and the alcohol (B) is applied to an arbitrary sheet-like substrate using a solvent-free laminator, thereby forming an adhesive layer. Subsequently, the adhesive layer and a separate arbitrary sheet-like substrate are bonded together, and aging is performed at normal temperature or under heating to cure the composition and obtain the laminate. In consideration of the workability during application and the viscosity of the solvent-free adhesive composition under heating, the application temperature is typically within a range from 40 to 100° C., and preferably from 60 to 90° C., but performing the application at a higher temperature imparts superior elasticity when the temperature is cooled following application, and is preferred in terms of preventing winding deviation and the like. The amount applied of the adhesive composition may be selected appropriately in accordance with the type of substrates and the application conditions and the like, but is typically within a range from 1.0 to 5.0 g/m$^2$, and preferably from 1.5 to 4.5 g/m$^2$.

Further, from the viewpoint of ensuring sufficient working time, the viscosity of the solvent-free adhesive composition of the present invention following mixing of the polyisocyanate (A) and the alcohol (B) and then standing for 30 to 40 minutes under the application temperature conditions is preferably not more than 12,000 mPa·s, and is more preferably 8,000 mPa·s or less.

Examples of materials that can be used as the sheet-like substrates include plastic films of polyester, polyamide, polyethylene or polypropylene or the like; metallized films having a deposited layer of aluminum, silicon oxide or aluminum oxide or the like; and metal foils of stainless steel, iron, copper, or lead or the like. The combination of substrates may be selected as appropriate depending on the application in which the laminate is to be used, and a combination of two or more plastic films, or a combination of a plastic film with a metallized film or a metal foil may be used.

The solvent-free adhesive composition of the present invention can be used favorably, particularly in a metal foil-containing laminated composite film used in a high-temperature sterilization treatment, as the adhesive for bonding the metal foil (such as an aluminum foil) that functions as the barrier layer and the plastic film (such as a polypropylene film) that faces the contents.

As mentioned above, in one embodiment of the present invention, the alcohol (B) may be composed solely of the polyol (B1).

In other words, one embodiment of the present invention relates to an adhesive composition containing a polyisocyanate component (A) and a polyol component (B1), wherein
the polyisocyanate component (A) contains a trifunctional or higher isocyanate compound (C1), and a reaction product (E) obtained by reacting 25 to 65 mol % of a monofunctional alcohol (D) relative to 100 mol % of the isocyanate groups in a trifunctional or higher isocyanate compound (C2),
the acid value of the polyol component (B1) is within a range from 1 to 15 mgKOH/g, and
the equivalence ratio between the isocyanate groups in the polyisocyanate component (A) and the hydroxyl groups in the polyol component (B1) (isocyanate groups/hydroxyl groups) is within a range from 80/100 to 250/100.

Further, one embodiment of the present invention relates to the adhesive composition described above, wherein the reaction product (E) is included in an amount of 20 to 80% by weight of 100% by weight of the polyisocyanate component (A).

Further, one embodiment of the present invention may be the adhesive composition described above, wherein the trifunctional or higher isocyanate compound (C1) is a trimer of at least one diisocyanate compound selected from the group consisting of aliphatic diisocyanates, araliphatic diisocyanates and alicyclic diisocyanates.

Furthermore, one embodiment of the present invention may be the adhesive composition described above, wherein the trifunctional or higher isocyanate compound (C2) is a trimer of at least one diisocyanate compound selected from the group consisting of aliphatic diisocyanates, araliphatic diisocyanates and alicyclic diisocyanates.

Further, one embodiment of the present invention may be the adhesive composition described above, wherein the monofunctional alcohol (D) is an alicyclic alcohol (D1).

Further, one embodiment of the present invention may be the adhesive composition described above, wherein at least 70 mol % of all the hydroxyl groups in the polyol (B1) are primary hydroxyl groups.

Furthermore, one embodiment of the present invention may be the adhesive composition described above, wherein the adhesive composition is solvent-free.

Moreover, another embodiment of the present invention includes a laminate that is obtained by laminating at least two sheet-like substrates using the adhesive composition described above.

EXAMPLES

The present invention is described below in further detail using a series of examples, but the scope of the present invention is in no way limited by the following examples. In the examples, "parts" represents "parts by weight", and "%" represents "% by weight".

In the examples, the methods used for measuring the "viscosity", "number average molecular weight", "hydroxyl value", "acid value" and "isocyanate equivalence" were as follows.

Viscosity: measured using a B-type viscometer (manufactured by Tokyo Keiki Inc., model number: BL).

Number average molecular weight: the polystyrene-equivalent molecular weight was used, and was measured using a Shodex GPC LF-604 column (manufactured by Shodex Inc.) and a GPC apparatus (GPC-104, manufactured by Shodex Inc.) fitted with an RI detector, and using THF as the developing solvent.

Hydroxyl value: measured in accordance with JIS K1557-1.

Acid value: measured in accordance with JIS K0070.

Isocyanate equivalence: measured in accordance with JIS K1603-1.

<Isocyanate Compound (C1)>

The following compounds were used as isocyanate compounds (C1-1) to (C1-3).
- C1-1: HDI biuret (product name: Basonat HB-100, manufactured by BASF Corporation)
- C1-2: HDI nurate (product name: TAKENATE D177N, manufactured by Mitsui Chemicals, Inc.)
- C1-3: IPDI nurate (product name: VESTANT T1890/100, manufactured by Evonik Industries AG)

(Synthesis Example 11) Isocyanate Compound (C1-4)

A reaction container was charged with 166.2 parts of a polyoxypropylene glyceryl ether having a number average molecular weight of 1,000 and an average number of hydroxyl groups of 3, and 83.8 parts of hexamethylene diisocyanate (200 mol % of isocyanate groups relative to 100 mol % of hydroxyl groups), and the mixture was reacted for 4 hours at 110° C. under constant stirring and under a stream of nitrogen gas, yielding an isocyanate compound (C1-4) with a number average molecular weight of 1,500. The isocyanate equivalence was 8.4%.

(Synthesis Example 12) Isocyanate Compound (C1-5)

A reaction container was charged with 87.2 parts of a polyoxypropylene glycol having a number average molecular weight of 600 and an average number of hydroxyl groups of 2, and 162.8 parts of hexamethylene diisocyanate biuret (300 mol % of isocyanate groups relative to 100 mol % of hydroxyl groups), and the mixture was reacted for 4 hours at 110° C. under constant stirring and under a stream of nitrogen gas, yielding an isocyanate compound (C1-5) with a number average molecular weight of 1,600. The isocyanate equivalence was 9.8%.

Reaction Products (Alcohol-Added Isocyanates) (E) and (F)

(Synthesis Example 1) Alcohol-Added Isocyanate (E-1)

A reaction container was charged with 219.9 parts of hexamethylene diisocyanate biuret and 30.1 parts of cyclohexanol (equivalent to 25 mol % relative to 100 mol % of isocyanate groups), and the mixture was reacted for 4 hours at 110° C. under constant stirring and under a stream of nitrogen gas, yielding an alcohol-added isocyanate (E-1).

(Synthesis Example 2) Alcohol-Added Isocyanate (E-2)

A reaction container was charged with 209.8 parts of hexamethylene diisocyanate biuret and 40.2 parts of cyclohexanol (equivalent to 35 mol % relative to 100 mol % of isocyanate groups), and the mixture was reacted for 4 hours at 110° C. under constant stirring and under a stream of nitrogen gas, yielding an alcohol-added isocyanate (E-2).

(Synthesis Example 3) Alcohol-Added Isocyanate (E-3)

A reaction container was charged with 184.4 parts of hexamethylene diisocyanate biuret and 65.6 parts of cyclohexanol (equivalent to 65 mol % relative to 100 mol % of isocyanate groups), and the mixture was reacted for 4 hours at 110° C. under constant stirring and under a stream of nitrogen gas, yielding an alcohol-added isocyanate (E-3).

(Synthesis Example 4) Alcohol-Added Isocyanate (E-4)

A reaction container was charged with 209.8 parts of hexamethylene diisocyanate biuret and 40.2 parts of hexanol (equivalent to 35 mol % relative to 100 mol % of isocyanate groups), and the mixture was reacted for 4 hours at 90° C. under constant stirring and under a stream of nitrogen gas, yielding an alcohol-added isocyanate (E-4).

(Synthesis Example 5) Alcohol-Added Isocyanate (E-5)

A reaction container was charged with 193.9 parts of hexamethylene diisocyanate biuret and 56.1 parts of borneol (equivalent to 35 mol % relative to 100 mol % of isocyanate groups), and the mixture was reacted for 4 hours at 110° C. under constant stirring and under a stream of nitrogen gas, yielding an alcohol-added isocyanate (E-5).

(Synthesis Example 6) Alcohol-Added Isocyanate (E-6)

A reaction container was charged with 193.3 parts of hexamethylene diisocyanate biuret and 56.7 parts of 1-menthol (equivalent to 35 mol % relative to 100 mol % of isocyanate groups), and the mixture was reacted for 4 hours at 110° C. under constant stirring and under a stream of nitrogen gas, yielding an alcohol-added isocyanate (E-6).

(Synthesis Example 7) Alcohol-Added Isocyanate (E-7)

A reaction container was charged with 213.6 parts of hexamethylene diisocyanate nurate and 36.4 parts of cyclohexanol (equivalent to 35 mol % relative to 100 mol % of isocyanate groups), and the mixture was reacted for 4 hours at 110° C. under constant stirring and under a stream of nitrogen gas, yielding an alcohol-added isocyanate (E-7).

(Synthesis Example 13) Alcohol-Added Isocyanate (E-8)

A reaction container was charged with 237.9 parts of the isocyanate compound (C1-4) and 12.1 parts of cyclohexanol (equivalent to 25 mol % relative to 100 mol % of isocyanate groups), and the mixture was reacted for 4 hours at 110° C. under constant stirring and under a stream of nitrogen gas, yielding an alcohol-added isocyanate (E-8) with a number average molecular weight of 1,580.

(Synthesis Example 14) Alcohol-Added Isocyanate (E-9)

A reaction container was charged with 236.0 parts of the isocyanate compound (C1-5) and 14.0 parts of cyclohexanol (equivalent to 25 mol % relative to 100 mol % of isocyanate groups), and the mixture was reacted for 4 hours at 110° C. under constant stirring and under a stream of nitrogen gas, yielding an alcohol-added isocyanate (E-9) with a number average molecular weight of 1,700.

(Synthesis Example 8) Alcohol-Added Isocyanate (F)

A reaction container was charged with 231.0 parts of hexamethylene diisocyanate biuret and 19.0 parts of cyclohexanol (equivalent to 15 mol % relative to 100 mol % of isocyanate groups), and the mixture was reacted for 4 hours at 110° C. under constant stirring and under a stream of nitrogen gas, yielding an alcohol-added isocyanate (F).

Polyol (B1)

(Synthesis Example 9) Polyol (B1-1)

A reaction container was charged with 175 parts of isophthalic acid, 320 parts of adipic acid, 49 parts of benzoic acid, 76 parts of ethylene glycol and 380 parts of neopentyl glycol, and an esterification was performed by heating at 150° C. to 240° C. under constant stirring and under a stream of nitrogen gas. When the acid value reached 2.1 (mgKOH/g), the reaction temperature was adjusted to 200° C., the pressure inside the reaction container was gradually reduced, and following the reaction for 30 minutes at a pressure of 1.3 kPa or lower, the reaction mixture was cooled to 110° C. Subsequently, 5.0 parts of trimellitic anhydride was added and an acid modification was performed at 110° C., yielding a polyol (B1-1). All of the hydroxyl groups of the obtained polyol (B1-1) were primary hydroxyl groups, the number average molecular weight was 750, the acid value was 3.6, and the hydroxyl value was 104.

(Synthesis Example 10) Polyol (B1-2)

A reaction container was charged with 438 parts of isophthalic acid, 106 parts of ethylene glycol and 200 parts of neopentyl glycol, and an esterification was performed by heating at 150° C. to 240° C. under constant stirring and under a stream of nitrogen gas. When the acid value reached 1.5 (mgKOH/g), the reaction temperature was adjusted to 200° C., the pressure inside the reaction container was gradually reduced, and following the reaction for 30 minutes at a pressure of 1.3 kPa or lower, the reaction mixture was cooled to 110° C. Subsequently, 5.0 parts of trimellitic anhydride was added and an acid modification was performed at 110° C., yielding a polyol (B1-2). All of the hydroxyl groups of the obtained polyol (B1-2) were primary hydroxyl groups, the number average molecular weight was 850, the acid value was 5.1, and the hydroxyl value was 93.

(Synthesis Example 15) Polyol (B1-3)

A reaction container was charged with 175 parts of isophthalic acid, 320 parts of adipic acid, 49 parts of benzoic acid, 76 parts of ethylene glycol and 380 parts of neopentyl glycol, and an esterification was performed by heating at 150° C. to 240° C. under constant stirring and under a stream of nitrogen gas. When the acid value reached 2.1 (mgKOH/g), the reaction temperature was adjusted to 200° C., the pressure inside the reaction container was gradually reduced, and following the reaction for 30 minutes at a pressure of 1.3 kPa or lower, the reaction mixture was cooled to 110° C. Subsequently, 28 parts of trimellitic anhydride was added and an acid modification was performed at 110° C., yielding a polyol (B1-3). All of the hydroxyl groups of the obtained polyol (B1-3) were primary hydroxyl groups, the number average molecular weight was 750, the acid value was 20.1, and the hydroxyl value was 97.

(Synthesis Example 16) Polyol (B1-4)

A reaction container was charged with 175 parts of isophthalic acid, 320 parts of adipic acid, 49 parts of benzoic acid, 76 parts of ethylene glycol and 380 parts of neopentyl glycol, and an esterification was performed by heating at 150° C. to 240° C. under constant stirring and under a stream of nitrogen gas. When the acid value reached 2.1 (mgKOH/g), the reaction temperature was adjusted to 200° C., the pressure inside the reaction container was gradually reduced, and following the reaction for 30 minutes at a pressure of 1.3 kPa or lower, the reaction mixture was cooled to 110° C. Subsequently, 21 parts of trimellitic anhydride was added and an acid modification was performed at 110° C., yielding a polyol (B1-4). All of the hydroxyl groups of the obtained polyol (B1-4) were primary hydroxyl groups, the number average molecular weight was 750, the acid value was 15.0, and the hydroxyl value was 99.

(Synthesis Example 17) Polyol (B1-5)

A reaction container was charged with 175 parts of isophthalic acid, 320 parts of adipic acid, 49 parts of benzoic acid, 76 parts of ethylene glycol and 380 parts of neopentyl glycol, and an esterification was performed by heating at 150° C. to 240° C. under constant stirring and under a stream of nitrogen gas. When the acid value reached 2.1 (mgKOH/g), the reaction temperature was adjusted to 200° C., the pressure inside the reaction container was gradually reduced, and following the reaction for 30 minutes at a pressure of 1.3 kPa or lower, the reaction mixture was cooled to 110° C. Subsequently, 14 parts of trimellitic anhydride was added and an acid modification was performed at 110° C., yielding a polyol (B1-5). All of the hydroxyl groups of the obtained polyol (B1-5) were primary hydroxyl groups, the number average molecular weight was 750, the acid value was 10.2, and the hydroxyl value was 101.

<Monofunctional Alcohol (B2)>

The following compounds were used as monofunctional alcohols (B2-1) to (B2-4).

B2-1: a polyoxypropylene alkyl ether (product name: Unilube MB-38, manufactured by NOF Corporation, theoretical hydroxyl value: 28 mgKOH/g)

B2-2: a castor oil-based monofunctional alcohol (product name: URIC H-31, manufactured by Itoh Oil Chemicals Co., Ltd., theoretical hydroxyl value: 187 mgKOH/g)

B2-3: a polyoxyalkylene alkyl ether (product name: Unilube 50 MB-72, manufactured by NOF Corporation, theoretical hydroxyl value: 18 mgKOH/g)

B2-4: hexyldecanol (product name: Risonol 16SP, manufactured by Kokyu Alcohol Kogyo Co., Ltd., theoretical hydroxyl value: 231 mgKOH/g)

<Preparation of Adhesive Compositions>

Formulations of various adhesive compositions are shown in Table 1 and Table 2.

The trifunctional or higher isocyanate compounds (C1-1) to (C1-5), the alcohol-added isocyanates (E-1) to (E-9) or (F), the polyols (B1-1) to (B1-5), and the optional monofunctional alcohols (B2-1) to (B2-4) and additives were mixed under heating in the blend ratios shown in Table 1 and Table 2 to prepare solvent-free adhesive compositions of Examples 1 to 41 and Comparative Examples 1 to 4.

TABLE 1

| | Component | | Example 1 | Example 2 | Example 3 | Example 4 | Example 5 | Example 6 | Example 7 | Example 8 | Example 9 |
|---|---|---|---|---|---|---|---|---|---|---|---|
| Poly-isocyanate (A) | Trifunctional or higher isocyanate compound (C1) | (C1-1) | 25 | 25 | 25 | 25 | 25 | 25 | 6 | 15 | 30 |
| | | (C1-2) | | | | | | | | | |
| | | (C1-3) | 10 | 10 | 10 | 10 | 10 | 10 | 4 | 10 | 10 |
| | | (C1-4) | | | | | | | | | |
| | | (C1-5) | | | | | | | | | |
| | Alcohol-added isocyanate (E) | (E-1) | 15 | | | | | | | | |
| | | (E-2) | | 15 | | | | | | 40 | 25 | 10 |
| | | (E-3) | | | 15 | | | | | | |
| | | (E-4) | | | | 15 | | | | | |
| | | (E-5) | | | | | 15 | | | | |
| | | (E-6) | | | | | | 15 | | | |
| | | (E-7) | | | | | | | | | |
| | | (E-8) | | | | | | | | | |
| | | (E-9) | | | | | | | | | |
| | Alcohol-added isocyanate (F) | | | | | | | | | | |
| Alcohol (B) | Polyol (B1) | (B1-1) | 100 | 100 | 100 | 100 | 100 | 100 | 70 | 100 | 100 |
| | | (B1-2) | | | | | | | | | |
| | | (B1-5) | | | | | | | | | |
| Additives | 3-glycidoxy-propyltrimethoxysilane | | 1.0 | 1.0 | 1.0 | 1.0 | 1.0 | 1.0 | 0.7 | 1.0 | 1.0 |
| | Phosphoric acid | | 0.10 | 0.10 | 0.10 | 0.10 | 0.10 | 0.10 | 0.07 | 0.10 | 0.10 |
| | Ratio of isocyanate groups/hydroxyl groups | | 1.21 | 1.16 | 1.04 | 1.16 | 1.16 | 1.14 | 1.33 | 1.03 | 1.22 |
| Adhesive strength | Adhesive strength before heat sterilization | | 7N | 10N | 6N | 8N | 12N | 11N | 7N | 8N | 8N |

TABLE 1-continued

| | | | | | | | | | | |
|---|---|---|---|---|---|---|---|---|---|---|
| (T-peel strength N/15 mm) | Adhesive strength after heat sterilization [1] | 7N | 8N | 6N | 7N | 9N | 9N | 6N | 7N | 7N |
| | Contents resistance [1] | C | B | B | C | B | B | B | B | C |
| | Pot life (70° C.) | C | B | B | B | B | B | C | B | C |
| | Pot life (60° C.) | A | A | A | A | A | A | A | A | A |

| | Component | | Example 10 | Example 11 | Example 12 | Example 13 | Example 14 | Example 15 | Example 16 | Example 17 | Example 18 |
|---|---|---|---|---|---|---|---|---|---|---|---|
| Poly-isocyanate (A) | Trifunctional or higher isocyanate compound (C1) | (C1-1) | 15 | | | 25 | 20 | 21 | 25 | 25 | 25 |
| | | (C1-2) | | 25 | 30 | | | | | | |
| | | (C1-3) | 10 | 10 | 10 | 10 | 15 | 5 | 10 | | |
| | | (C1-4) | | | | | | | | 10 | |
| | | (C1-5) | | | | | | | | | 10 |
| | Alcohol-added isocyanate (E) | (E-1) | | | | | | | | 15 | 15 |
| | | (E-2) | 25 | 15 | | 15 | 15 | 24 | | | |
| | | (E-3) | | | 10 | | | | | | |
| | | (E-4) | | | | | | | | | |
| | | (E-5) | | | | | | | | | |
| | | (E-6) | | | | | | | | | |
| | | (E-7) | | | | | | | | 15 | |
| | | (E-8) | | | | | | | | | |
| | | (E-9) | | | | | | | | | |
| | Alcohol-added isocyanate (F) | | | | | | | | | | |
| Alcohol (B) | Polyol (B1) | (B1-1) | 120 | 66 | 50 | | 100 | 100 | 100 | 100 | 100 |
| | | (B1-2) | | | | 100 | | | | | |
| | | (B1-5) | | | | | | | | | |
| Additives | 3-glycidoxy-propyltrimethoxysilane | | 1.2 | 0.7 | 0.5 | 1.0 | 1.0 | 1.0 | 1.0 | 1.0 | 1.0 |
| | Phosphoric acid | | 0.12 | 0.07 | 0.05 | 0.10 | 0.10 | 0.10 | 0.10 | 0.10 | 0.10 |
| Ratio of isocyanate groups/hydroxyl groups | | | 0.86 | 1.64 | 2.09 | 1.23 | 1.13 | 1.08 | 1.14 | 1.09 | 1.09 |
| Adhesive strength (T-peel strength N/15 mm) | Adhesive strength before heat sterilization | | 6N | 9N | 6N | 7N | 7N | 8N | 10N | 9N | 9N |
| | Adhesive strength after heat sterilization [1] | | 6N | 8N | 6N | 6N | 6N | 6N | 8N | 6N | 6N |
| | Contents resistance [1] | | B | B | C | B | C | B | B | C | C |
| | Pot life (70° C.) | | B | B | B | B | B | B | B | C | C |
| | Pot life (60° C.) | | A | A | A | A | A | A | A | A | A |

| | Component | | Example 19 | Example 20 | Example 21 | Comparative Example 1 | Comparative Example 2 | Comparative Example 3 | Comparative Example 4 |
|---|---|---|---|---|---|---|---|---|---|
| Poly-isocyanate (A) | Trifunctional or higher isocyanate compound (C1) | (C1-1) | 25 | 25 | 25 | 40 | | 25 | |
| | | (C1-2) | | | | | 40 | | 25 |
| | | (C1-3) | 10 | 10 | 10 | 10 | 10 | 10 | 10 |
| | | (C1-4) | | | | | | | |
| | | (C1-5) | | | | | | | |
| | Alcohol-added isocyanate (E) | (E-1) | | | | 15 | | | |
| | | (E-2) | | | | | | | |
| | | (E-3) | | | | | | | |
| | | (E-4) | | | | | | | |
| | | (E-5) | | | | | | | |
| | | (E-6) | | | | | | | |
| | | (E-7) | | | | | | | |
| | | (E-8) | 15 | | | | | | |
| | | (E-9) | | 15 | | | | | |
| | Alcohol-added isocyanate (F) | | | | | | | 15 | 15 |
| Alcohol (B) | Polyol (B1) | (B1-1) | 100 | 100 | | 100 | 100 | 100 | 100 |
| | | (B1-2) | | | | | | | |
| | | (B1-5) | | | 100 | | | | |
| Additives | 3-glycidoxy-propyltrimethoxysilane | | 1.0 | 1.0 | 1.0 | 1.0 | 1.0 | 1.0 | 1.0 |
| | Phosphoric acid | | 0.10 | 0.10 | 0.10 | 0.10 | 0.10 | 0.10 | 0.10 |
| Ratio of isocyanate groups/hydroxyl groups | | | 1.08 | 1.07 | 1.26 | 1.35 | 1.23 | 1.26 | 1.18 |
| Adhesive strength (T-peel strength N/15 mm) | Adhesive strength before heat sterilization | | 9N | 9N | 7N | 6N | 5N | 7N | 6N |
| | Adhesive strength after heat sterilization [1] | | 6N | 6N | 6N | 6N | 4N | 6N | 5N |

TABLE 1-continued

|  |  |  |  |  |  |  |
|---|---|---|---|---|---|---|
| Contents resistance [1] | C | C | B | D | D | D | D |
| Pot life (70° C.) | C | C | D | C | C | C | C |
| Pot life (60° C.) | A | A | B | A | A | A | A |

Numerical values indicate blend proportions (parts by weight)

TABLE 2

| Component | | | Example 22 | Example 23 | Example 24 | Example 25 | Example 26 | Example 27 | Example 28 |
|---|---|---|---|---|---|---|---|---|---|
| Poly-isocyanate (A) | Trifunctional or higher isocyanate compound (C1) | (C1-1) | 25 | 25 | 25 | 25 | 25 | 25 | 25 |
| | | (C1-2) | | | | | | | |
| | | (C1-3) | 10 | 10 | 10 | 10 | 10 | 10 | 10 |
| | | (C1-4) | | | | | | | |
| | | (C1-5) | | | | | | | |
| | Alcohol-added isocyanate (E) | (E-1) | 15 | 15 | 15 | 15 | | | |
| | | (E-2) | | | | | 15 | | |
| | | (E-4) | | | | | | 15 | |
| | | (E-5) | | | | | | | 15 |
| | | (E-6) | | | | | | | |
| | | (E-8) | | | | | | | |
| | | (E-9) | | | | | | | |
| Alcohol (B) | Polyol (B1) | (B1-3) | 80 | 90 | 80 | 90 | 60 | 60 | 60 |
| | | (B1-4) | | | | | | | |
| | Monofunctional alcohol (B2) | (B2-1) | 20 | | | | 40 | | |
| | | (B2-2) | | 10 | | | | 40 | |
| | | (B2-3) | | | 20 | | | | |
| | | (B2-4) | | | | 10 | | | 40 |
| Ratio of isocyanate groups/hydroxyl groups | | | 1.53 | 1.20 | 1.57 | 1.15 | 1.58 | 0.92 | 1.84 |
| Xa/56.1 × Xc − Yh/56.1 × Yc | | | 0.18 | −0.01 | 0.22 | −0.09 | 0.01 | −1.12 | 0.09 |
| Adhesive strength (T-peel strength N/15 mm) | Adhesive strength before heat sterilization | | 6N | 7N | 6N | 7N | 9N | 8N | 11N |
| | Adhesive strength after heat sterilization [2] | | 6N | 7N | 6N | 7N | 8N | 7N | 9N |
| Contents resistance [1] | | | B | B | B | B | B | B | B |
| Contents resistance [2] | | | A | A | A | A | C | C | C |
| Pot life (60° C.) | | | A | A | A | A | A | A | A |

| Component | | | Example 29 | Example 30 | Example 31 | Example 32 | Example 33 | Example 34 | Example 35 |
|---|---|---|---|---|---|---|---|---|---|
| Poly-isocyanate (A) | Trifunctional or higher isocyanate compound (C1) | (C1-1) | 25 | 6 | 30 | 15 | | 25 | 25 |
| | | (C1-2) | | | | | 30 | | |
| | | (C1-3) | 10 | 4 | 10 | 10 | 10 | | |
| | | (C1-4) | | | | | | 10 | |
| | | (C1-5) | | | | | | | 10 |
| | Alcohol-added isocyanate (E) | (E-1) | | 40 | 10 | | 10 | 15 | 15 |
| | | (E-2) | | | | 25 | | | |
| | | (E-4) | | | | | | | |
| | | (E-5) | | | | | | | |
| | | (E-6) | 15 | | | | | | |
| | | (E-8) | | | | | | | |
| | | (E-9) | | | | | | | |
| Alcohol (B) | Polyol (B1) | (B1-3) | 60 | 70 | | 100 | 40 | 85 | 85 |
| | | (B1-4) | | | 80 | | | | |
| | Monofunctional alcohol (B2) | (B2-1) | | 30 | | 20 | | 15 | 15 |
| | | (B2-2) | | | 20 | | 10 | | |
| | | (B2-3) | | | | | | | |
| | | (B2-4) | 40 | | | | | | |
| Ratio of isocyanate groups/hydroxyl groups | | | 0.80 | 1.39 | 1.14 | 1.06 | 2.13 | 1.33 | 1.33 |
| Xa/56.1 × Xc − Yh/56.1 × Yc | | | −1.44 | 0.10 | −0.45 | 0.21 | −0.38 | 0.23 | 0.23 |
| Adhesive strength (T-peel strength N/15 mm) | Adhesive strength before heat sterilization | | 10N | 7N | 8N | 6N | 7N | 8N | 8N |
| | Adhesive strength after heat sterilization [2] | | 8N | 6N | 7N | 6N | 6N | 6N | 6N |
| Contents resistance [1] | | | B | B | B | B | B | B | B |
| Contents resistance [2] | | | C | A | B | A | B | B | B |
| Pot life (60° C.) | | | A | B | A | B | A | B | B |

TABLE 2-continued

| | Component | | Example 36 | Example 37 | Example 38 | Example 39 | Example 40 | Example 41 |
|---|---|---|---|---|---|---|---|---|
| Poly-isocyanate (A) | Trifunctional or higher isocyanate compound (C1) | (C1-1) | 25 | 25 | 25 | 25 | 25 | 25 |
| | | (C1-2) | | | | | | |
| | | (C1-3) | 10 | 10 | 10 | 10 | 10 | 10 |
| | | (C1-4) | | | | | | |
| | | (C1-5) | | | | | | |
| | Alcohol-added isocyanate (E) | (E-1) | | | 15 | 15 | 15 | 15 |
| | | (E-2) | | | | | | |
| | | (E-4) | | | | | | |
| | | (E-5) | | | | | | |
| | | (E-6) | | | | | | |
| | | (E-8) | 15 | | | | | |
| | | (E-9) | | 15 | | | | |
| Alcohol (B) | Polyol (B1) | (B1-3) | 85 | 85 | 88 | 97 | 85 | 97.5 |
| | | (B1-4) | | | | | | |
| | Monofunctional alcohol (B2) | (B2-1) | 15 | 15 | 12 | | | |
| | | (B2-2) | | | | | | |
| | | (B2-3) | | | | 3 | | |
| | | (B2-4) | | | | | 15 | |
| | | | | | | | | 2.5 |
| Ratio of isocyanate groups/hydroxyl groups | | | 1.31 | 1.30 | 1.44 | 1.28 | 1.50 | 1.27 |
| Xa/56.1 × Xc − Yh/56.1 × Yc | | | 0.23 | 0.23 | 0.25 | 0.25 | 0.26 | 0.24 |
| Adhesive strength (T-peel strength N/15 mm) | Adhesive strength before heat sterilization | | 8N | 8N | 6N | 7N | 6N | 7N |
| | Adhesive strength after heat sterilization [2] | | 6N | 6N | 6N | 7N | 6N | 7N |
| Contents resistance [1] | | | B | B | B | B | B | B |
| Contents resistance [2] | | | B | B | A | A | A | A |
| Pot life (60° C.) | | | B | B | C | C | C | C |

Numerical values indicate blend proportions (parts by weight)

<Preparation of Laminated Composite Films>

Composite films composed of polyethylene terephthalate (thickness: 12 μm, hereafter abbreviated as PET)/aluminum foil (thickness: 9 μm)/unstretched polypropylene (thickness: 70 μm, hereafter abbreviated as CPP) were prepared using the method described below.

First, a dry lamination adhesive suitable for high retort (product name: TM-250HV/CAT-RT86L-60, manufactured by Toyo-Morton, Ltd.) was applied to the PET film in an amount of 3.5 g/m² using a dry laminator, the coated surface and the aluminum foil were bonded together, and the thus obtained laminate was aged for three days in an environment at 40° C., thus obtaining a PET/aluminum foil laminate.

Subsequently, the solvent-free adhesive composition of each Example and each Comparative Example was applied to the aluminum foil surface of one of these PET/aluminum foil laminates in a coating amount of 3 g/m² at 70° C. using a solvent-free test coater, the coated surface and the CPP were bonded together, and the thus obtained laminate was aged for three days in an environment at 40° C., thus obtaining a PET/aluminum foil/CPP laminated composite film.

Coating with the test coater was performed at 60° C. and 70° C. for Examples 1 to 21 and Comparative Examples 1 to 4, and was performed at 60° C. for Examples 22 to 41.

<Pot Life (70° C.)>

For each adhesive composition, the viscosity was measured 40 minutes after uniform mixing at 70° C., and the pot life was then evaluated against the following criteria. The results are shown in Table 1.

B: viscosity of less than 8,000 mPa·s
C: viscosity of at least 8,000 mPa·s, but less than 12,000 mPa·s
D: viscosity of 12,000 mPa·s or greater <Pot Life (60° C.)>

For each adhesive composition, the viscosity was measured 30 minutes after uniform mixing at 60° C., and the pot life was then evaluated against the following criteria. The results are shown in Table 1 and Table 2.

A: viscosity of less than 10,000 mPa·s
B: viscosity of at least 10,000 mPa·s, but less than 12,000 mPa·s
C: viscosity of at least 12,000 mPa·s, but less than 15,000 mPa·s
D: viscosity of 15,000 mPa·s or greater For each of the laminated composite films prepared using the method described above, the physical properties of adhesive strength, retort resistance and contents resistance were evaluated using the following methods described below. The results are shown in Table 1 and Table 2.

<Adhesive Strength>

The laminated composite film prepared using the above method was cut to a width of 15 mm, and in an environment of 25° C. and 50% relative humidity, the film was pulled at a peeling rate of 300 mm/minute and the T-peel strength (N/15 mm) between the CPP and the aluminum foil was measured.

<Retort Resistance (Adhesive Strength after Heat Sterilization [1]), Contents Resistance [1]>

Using the laminated composite film prepared using the above method, a bag of dimensions 14 cm×18 cm was prepared with the CPP on the inside surface under conditions including heat sealing at 190° C. for 1 second. For contents, the bag was filled with a mixture of a 3% aqueous solution of acetic acid, ketchup and salad oil in a weight ratio of 1/1/1. The bag was subjected to hot water sterilization for 30 minutes using a rotational retort test apparatus under pressurized conditions including 30 rpm and 135° C., and the T-peel strength (N/15 mm) between the CPP and the aluminum foil (recorded as "adhesive strength after heat sterilization [1]") was then measured using the same method as that described above for the adhesive strength. Further, after storage for 4 weeks in an environment at 55° C., any changes in the external appearance of the bag were evaluated visually, and the contents resistance (recorded as "contents resistance [1]") was evaluated against the following criteria. The results are shown in the tables.

B: no orange peel-like patterns or small spot-like patterns, adhesive layer appears uniform (good)

C: some orange peel-like patterns or small spot-like patterns observed (usable)

D: multitude of orange peel-like patterns or small spot-like patterns observed (unusable)

<Retort Resistance (Adhesive Strength after Heat Sterilization [2]), Contents Resistance [2]>

With the exception of replacing the contents with a 3% aqueous solution of acetic acid, a bag filled with contents was prepared using the same procedure as that described above. This bag was subjected to hot water sterilization for 30 minutes using a rotational retort test apparatus under pressurized conditions including 30 rpm and 135° C., and the T-peel strength (N/15 mm) between the CPP and the aluminum foil (recorded as "adhesive strength after heat sterilization [2]") was then measured using the same method as that described above for the adhesive strength. Further, after storage for 4 weeks in an environment at 55° C., any changes in the external appearance of the bag were evaluated visually, and the contents resistance (recorded as "contents resistance [2]") was evaluated against the following criteria. The results are shown in the tables.

A: no orange peel-like patterns or small spot-like patterns, adhesive layer appears uniform (extremely good)

B: very slight orange peel-like patterns or small spot-like patterns observed (good)

C: some orange peel-like patterns or small spot-like patterns observed (usable)

D: multitude of orange peel-like patterns or small spot-like patterns observed (unusable)

As illustrated in Table 1 and Table 2, it was evident that the adhesive composition of the present invention had good workability, and exhibited excellent adhesive strength and acid resistance.

The invention claimed is:

1. A method for producing an adhesive composition, the method comprising:
   a step of obtaining an alcohol-added isocyanate (E) by reacting a trifunctional or higher isocyanate compound (C2) and a monofunctional alcohol (D) at an equivalence ratio of isocyanate groups in the trifunctional or higher isocyanate compound (C2):monofunctional alcohol (D)=100 mol %:25 to 65 mol %, and
   a step of mixing a polyisocyanate (A) comprising a trifunctional or higher isocyanate compound (C1) and the alcohol-added isocyanate (E), and an alcohol (B) having an acid value of 0.5 to 30 mgKOH/g, so that an equivalence ratio between isocyanate groups in the polyisocyanate (A) and hydroxyl groups in the alcohol (B) (isocyanate groups/hydroxyl groups) is within a range from 0.7 to 2.5.

2. The method for producing an adhesive composition according to claim 1, wherein the alcohol-added isocyanate (E) is included in an amount of 20 to 80% by weight out of 100% by weight of the polyisocyanate (A).

3. The method for producing an adhesive composition according to claim 1, wherein the trifunctional or higher isocyanate compound (C1) is a trimer of at least one diisocyanate compound selected from the group consisting of aliphatic diisocyanates, araliphatic diisocyanates and alicyclic diisocyanates.

4. The method for producing an adhesive composition according to claim 1, wherein the trifunctional or higher isocyanate compound (C2) is a trimer of at least one diisocyanate compound selected from the group consisting of aliphatic diisocyanates, araliphatic diisocyanates and alicyclic diisocyanates.

5. The method for producing an adhesive composition according to claim 1, wherein the monofunctional alcohol (D) is an alicyclic alcohol (D1).

6. The method for producing an adhesive composition according to claim 1, wherein the alcohol (B) comprises a polyol (B1) having an acid value of 1 to 15 mgKOH/g.

7. The method for producing an adhesive composition according to claim 6, wherein at least 70 mol % among 100 mol % of all hydroxyl groups within the polyol (B1) are primary hydroxyl groups.

8. The method for producing an adhesive composition according to claim 1, wherein the alcohol (B) comprises a polyol (B1) having an acid value of 15 to 40 mgKOH/g and a monofunctional alcohol (B2), wherein an amount of the monofunctional alcohol (B2) within 100% by weight of the alcohol (B) is not more than 50% by weight.

9. The method for producing an adhesive composition according to claim 8, wherein the adhesive composition satisfies a relationship of formula 1 shown below:

$$Xa/56.1 \times Xc - Yh/56.1 \times Yc \leq 0.26 \quad (1)$$

wherein $Xa$ represents an acid value (mgKOH/g) of the polyol (B1), $Xc$ represents a weight ratio of the polyol (B1) within a total weight of the polyol (B1) and the monofunctional alcohol (B2), $Yh$ represents a hydroxyl value (mgKOH/g) of the monofunctional alcohol (B2), and $Yc$ represents a weight ratio of the monofunctional alcohol (B2) within a total weight of the polyol (B1) and the monofunctional alcohol (B2).

10. The method for producing an adhesive composition according to claim 8, wherein a molecular weight of the monofunctional alcohol (B2) is at least 100 but not more than 6,000.

11. The method for producing an adhesive composition according to claim 1, wherein the adhesive composition is solvent-free.

12. The method for producing an adhesive composition according to claim 1, wherein the adhesive composition is for use in a laminated composite film containing a metal foil.

13. A method for producing a laminate, the method comprising a step of bonding at least two sheet-like substrates using an adhesive composition produced using the method for producing an adhesive composition according to claim 1.

* * * * *

UNITED STATES PATENT AND TRADEMARK OFFICE
CERTIFICATE OF CORRECTION

PATENT NO. : 9,951,259 B2
APPLICATION NO. : 15/538656
DATED : April 24, 2018
INVENTOR(S) : Tetsuya Natsumoto et al.

Page 1 of 1

It is certified that error appears in the above-identified patent and that said Letters Patent is hereby corrected as shown below:

On the Title Page

Item (30) "Aug. 31, 2017 (JP).......2014-259659" should be changed to
--Dec. 24, 2014 (JP).......2014-259659--.

Signed and Sealed this
Twenty-sixth Day of June, 2018

Andrei Iancu
*Director of the United States Patent and Trademark Office*